(12) United States Patent
Gendron et al.

(10) Patent No.: US 11,161,528 B2
(45) Date of Patent: Nov. 2, 2021

(54) RAILWAY VEHICLE COACH

(71) Applicant: ALSTOM Transport Technologies, Saintouen (FR)

(72) Inventors: Marc Gendron, Lecelles (FR); Laurent Laloyaux, Avesnes-le-Sec (FR); Alexandre Sharawi, Sebourg (FR); Pascal Flament, Villeneuve d'Ascq (FR); Nicolas Delannoy, Saint Saulve (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 405 days.

(21) Appl. No.: 16/220,255

(22) Filed: Dec. 14, 2018

(65) Prior Publication Data

US 2019/0185028 A1 Jun. 20, 2019

(30) Foreign Application Priority Data

Dec. 15, 2017 (FR) ...................... 17 62246

(51) Int. Cl.
| | |
|---|---|
| *B61D 17/10* | (2006.01) |
| *B61F 1/08* | (2006.01) |
| *B61D 13/00* | (2006.01) |
| *B61D 17/18* | (2006.01) |
| *B32B 9/00* | (2006.01) |

(Continued)

(52) U.S. Cl.
CPC .............. *B61D 17/10* (2013.01); *B32B 9/007* (2013.01); *B32B 9/041* (2013.01); *B61D 13/00* (2013.01); *B61D 17/18* (2013.01); *B61F 1/08* (2013.01); *B61F 1/14* (2013.01); *B32B 2250/03* (2013.01);

(Continued)

(58) Field of Classification Search
CPC ... B61F 1/14; B61F 1/08; B61D 17/10; B61D 17/18; B61D 17/04; B61D 49/00; B61D 1/00; B61D 1/04; B61D 13/00; B32B 2250/03; B32B 9/007; B32B 9/041; B32B 2307/304; B32B 2307/3065;

(Continued)

(56) References Cited

U.S. PATENT DOCUMENTS 4,794,032 A 12/1988 Fujii et al.
5,558,932 A * 9/1996 Scanlon .................. B29C 70/08
442/277

(Continued)

FOREIGN PATENT DOCUMENTS

EP 0 241 116 A1 10/1987
EP 2 078 538 A1 7/2009
(Continued)

OTHER PUBLICATIONS

Philibert d'Hotelans et al. "Les tramways sur pneus Traslohr par NewTransLohr", Revue Generale Des Chemin De Fer : RCGF, No. 252, Sep. 1, 2015 (Sep. 1, 2015), pp. 24-35, XP055225788.
(Continued)

*Primary Examiner* — Zachary L Kuhfuss
*Assistant Examiner* — Cheng Lin
(74) *Attorney, Agent, or Firm* — Nixon & Vanderhye

(57) ABSTRACT

Disclosed is railway vehicle coach, including a chassis and a bogie arranged below the chassis in a vertical direction. The coach includes a thermally insulating screen, arranged between the chassis and the bogie, above the bogie in the vertical direction.

7 Claims, 2 Drawing Sheets

(51) Int. Cl.
  *B32B 9/04* (2006.01)
  *B61F 1/14* (2006.01)
(52) U.S. Cl.
  CPC ..... *B32B 2250/40* (2013.01); *B32B 2307/304* (2013.01); *B32B 2605/10* (2013.01)
(58) Field of Classification Search
  CPC ..... B60L 2200/18; B62D 47/00; B62D 47/02; B62D 25/2045
  USPC .............................. 105/329.1, 345, 397, 346
  See application file for complete search history.

(56) References Cited

U.S. PATENT DOCUMENTS

| | | | | |
|---|---|---|---|---|
| 8,286,560 | B2 * | 10/2012 | Hachet | B61D 17/10 105/422 |
| 9,592,839 | B2 * | 3/2017 | Hirashima | B61D 17/10 |
| 10,471,974 | B2 * | 11/2019 | Hirashima | B61D 17/10 |
| 2011/0147358 | A1 | 6/2011 | Kober et al. | |
| 2013/0220169 | A1 * | 8/2013 | Taguchi | B61F 1/12 105/397 |
| 2016/0059869 | A1 | 3/2016 | Liu et al. | |
| 2016/0297452 | A1 * | 10/2016 | Tateishi | B61F 1/08 |

FOREIGN PATENT DOCUMENTS

| | | |
|---|---|---|
| WO | 2012063721 A1 | 5/2012 |
| WO | 2017/017642 A1 | 2/2017 |
| WO | 2017/017642 A2 | 2/2017 |

OTHER PUBLICATIONS

FR Search Report, dated Aug. 2, 2018, from corresponding FR 1 762 246 application.

* cited by examiner

RAILWAY VEHICLE COACH

BACKGROUND OF THE INVENTION

Field of the Invention

The present invention relates to a railway vehicle coach, of the type comprising a chassis and a bogie arranged below the chassis in a vertical direction.

Description of the Related Art

Such a known coach is not, however, fully satisfactory. In particular, in case of fire near the bogie, the heat transfer in the chassis is high, which may cause a security failure for passengers located in the coach.

SUMMARY OF THE INVENTION

The invention in particular aims to resolve this drawback, by limiting the temperature in the floor in case of fire at the bogie.

To that end, the invention relates to a railway vehicle coach comprising a chassis and a bogie arranged below the chassis in a vertical direction, the coach including a thermally insulating screen, arranged between the chassis and the bogie, above the bogie in the vertical direction, characterized in that the screen includes a first part, a second part substantially perpendicular to the first part arranged away from the first part, and a substantially straight connecting part connecting the first and second parts.

The heat screen is arranged between the chassis and the bogie, above the bogie in a vertical direction. It limits the heat transfer by conduction in the chassis. Thus, in case of fire on the bogie, the temperature increase in the chassis is limited.

According to specific embodiments of the invention, the railway vehicle coach further has one or more of the following features, considered alone or according to any technically possible combination(s):
the second part is arranged below a passenger seat;
the first part is arranged behind a passenger seat;
the screen includes a first layer, a second layer, and a third thermally insulating layer arranged between the first and second layers; and
the third layer is made from graphite.

BRIEF DESCRIPTION OF THE DRAWINGS

Other features and advantages of the invention will appear upon reading the following description, provided solely as an example and done in reference to the appended drawings, in which.

DESCRIPTION OF THE PREFERRED EMBODIMENTS

Figure 1:
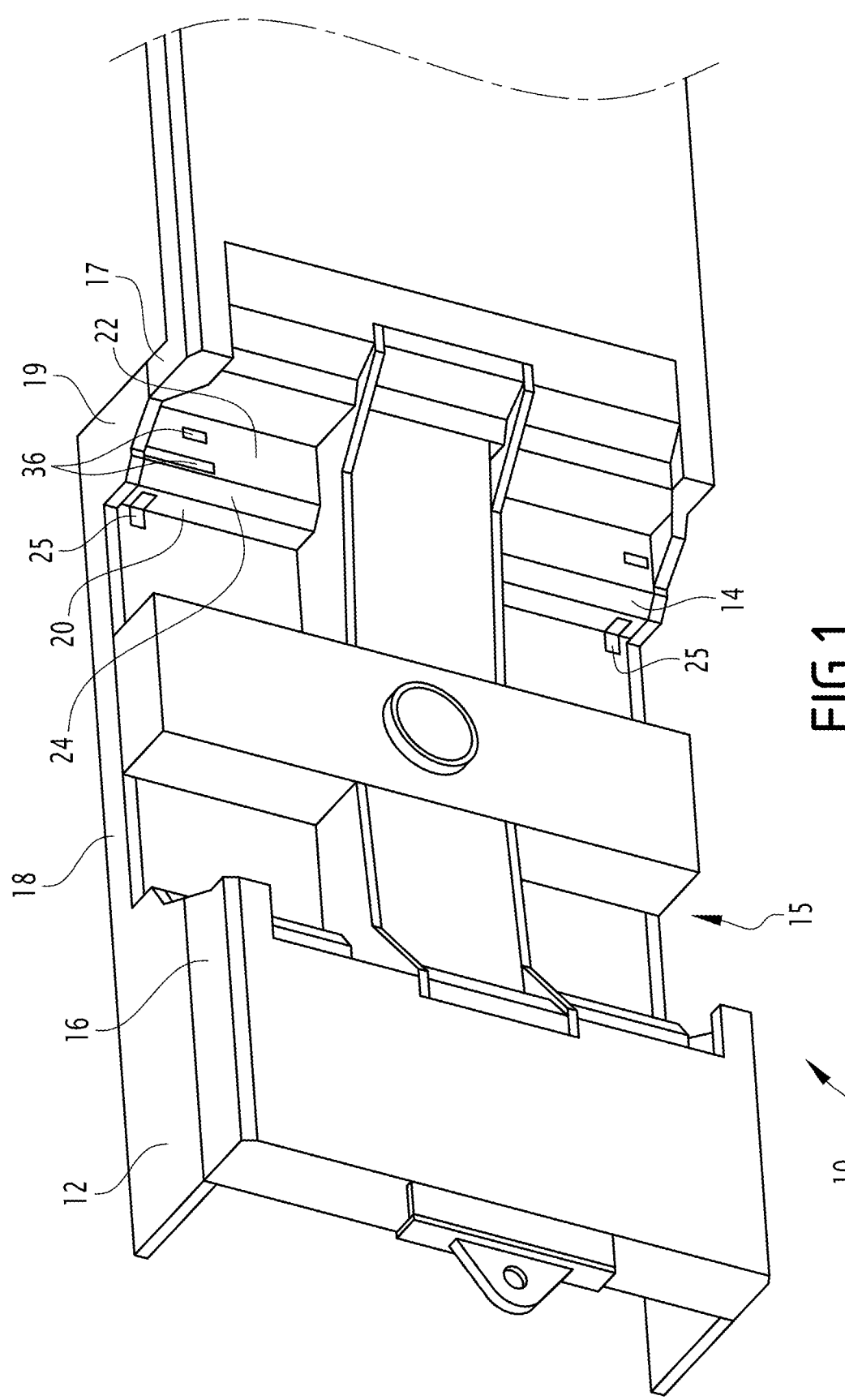
FIG. 1 is a perspective bottom view of a railway vehicle coach according to one example embodiment of the invention.

In reference to FIG. 1, the railway vehicle coach 10 includes a chassis 12, and a bogie (not shown in the Figures) arranged below the chassis 12 and supporting said chassis 12. The bogie is connected to the chassis 12 in a manner known in itself.

Figure 2:
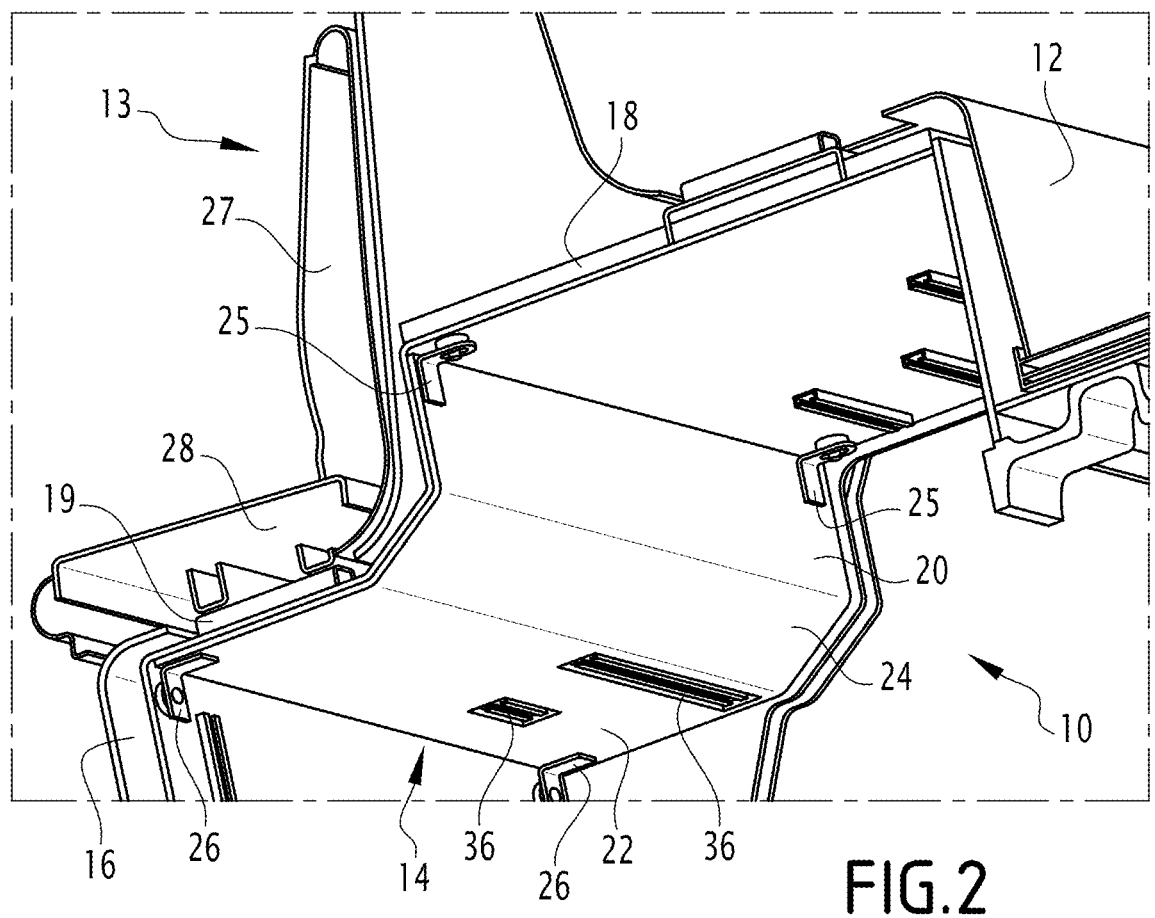
FIG. 2 is a detailed view of the insulating screen according to the invention insulating the coach of FIG. 1.

The chassis 12 delimits a passenger room, comprising at least one seat 13, shown in FIG. 2.

The car 10 according to the invention also includes a thermally insulating screen 14, arranged between the chassis 12 and the bogie, in a housing 15 receiving the bogie.

The housing 15 is in particular delimited by front 16 and rear 17 walls, by at least one upper panel 18, and by corner sections 19 each extending between one of the front 16 or rear 17 walls and an upper panel 18.

The insulating screen 14 advantageously covers one of the corner sections 19. More particularly, advantageously, each corner section 19 is covered by a respective insulating screen 14.

Thus, each insulating screen 14 is arranged above the bogie in a vertical direction. The vertical direction is defined relative to the traditional orientation of a railway vehicle.

The insulating screen 14 includes a first part 20 extending substantially in the vertical direction, a second part 22 extending substantially in a longitudinal direction perpendicular to the vertical direction, and a connecting part 24 that connects the first 20 and second 22 parts.

The first part 20 is substantially planar and arranged directly above the bogie. This first part 20 is connected to the corresponding upper panel 18 by connecting members 25.

The connecting part 24 has a substantially planar shape. As shown in FIG. 2, the first part 20 and the connecting part 24 together form an angle of between 0 and 90°, advantageously between 15° and 75°, and in particular an angle of 45°.

The second part 22 is substantially planar, and connected to a corresponding front 16 or rear 17 wall by linking elements 26.

The second part 22 and the connecting part 24 together form an angle of between 0 and 90°, advantageously between 15° and 75°, and in particular an angle of 45°.

In reference to FIG. 2, the insulating screen 14 extends at least partially below the seat 13 along the vertical direction.

The seat 13 includes a vertical part 27 forming a backrest, and a horizontal part 28 forming a seat bottom.

As shown in FIG. 2, the second part 22 of the screen 14 is arranged below the horizontal part 28 of the seat 13 along the horizontal direction. The first part 20 of the screen 14 is arranged behind the vertical part 27. Here, the front and rear orientations are understood relative to a traditional orientation of a seat, seen by a passenger seated on the seat 13.

Figure 3:
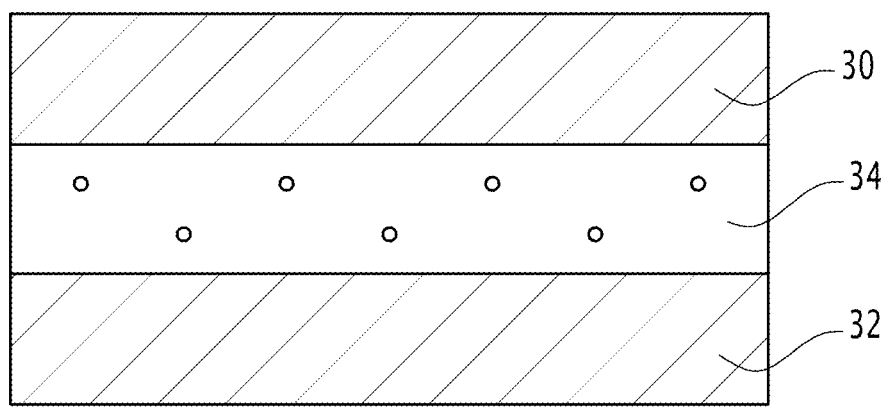
FIG. 3 is a schematic cross-sectional view of screen 14.

In reference to FIG. 3, the screen 14 includes at least a first layer 30, a second layer 32, and a third layer 34 arranged between the first and second layers 30, 32.

The third layer 34 is made from a thermally insulating material, for example graphite.

In the preferred embodiment of the invention, the first and second layers 30, 32 are made from metal, for example steel.

In one alternative, the screen 14 includes fastening supports 36 for cabling, suitable for receiving cables.

Owing to the invention described above, when a fire breaks out in the bogie part, the risks that the fire poses for the passengers are reduced. Indeed, the transfer of heat from the bogie to the passenger is reduced owing to the presence of the insulating screen 14.

The invention claimed is:
1. A railway vehicle coach comprising:
a chassis;
a bogie arranged below the chassis in a vertical direction; and a thermally insulating screen, wherein the screen includes a first part, a second part substantially perpendicular to the first part arranged away from the first part, and a substantially straight connecting part connecting the first and second parts, wherein both the first part and the second part of the thermally insulating screen are arranged between the chassis and the bogie, both the first part and the second part of the thermally insulating screen being above the bogie in the vertical direction, the passenger seat including a vertical part forming a backrest, and a horizontal part forming a seat bottom, the first part of the screen being arranged behind the vertical part of the seat, the first part of the screen facing the vertical part of the seat.

2. The railway vehicle coach according to claim 1, wherein the second part is arranged below a passenger seat.

3. The railway vehicle coach according to claim 1, wherein the first part is arranged behind a passenger seat.

4. The railway vehicle coach according to claim 1, wherein the screen includes a first layer, a second layer, and a third thermally insulating layer arranged between the first and second layers.

5. The railway vehicle coach according to claim 4, wherein the third layer is made from graphite.

6. A railway vehicle coach comprising:
a chassis;
a bogie arranged below the chassis in a vertical direction; and
a thermally insulating screen, wherein the screen includes a first part, a second part substantially perpendicular to the first part arranged away from the first part, and a substantially straight connecting part connecting the first and second parts, wherein both the first part and the second part of the thermally insulating screen are arranged between the chassis and the bogie, both the first part and the second part of the thermally insulating screen being above the bogie in the vertical direction, and wherein the first part is arranged behind a passenger seat, the passenger seat including a vertical part forming a backrest, and a horizontal part forming a seat bottom, the first part of the screen being arranged behind the vertical part of the seat, the first part of the screen facing the vertical part of the seat, the second part of the screen being arranged below the horizontal part of the seat, the second part of the screen facing the horizontal part of the seat.

7. A railway vehicle coach comprising:
a chassis;
a bogie arranged below the chassis in a vertical direction; and
a thermally insulating screen, wherein the screen includes a first part, a second part substantially perpendicular to the first part arranged away from the first part, and a substantially straight connecting part connecting the first and second parts, wherein both the first part and the second part of the thermally insulating screen are arranged between the chassis and the bogie, both the first part and the second part of the thermally insulating screen being above the bogie in the vertical direction, and wherein the first part is arranged behind a passenger seat, the passenger seat including a vertical part forming a backrest, and a horizontal part forming a seat bottom, the first part of the screen being arranged behind the vertical part of the seat, the first part of the screen facing the vertical part of the seat, the second part of the screen being arranged below the horizontal part of the seat, the second part of the screen facing the horizontal part of the seat, the first part of the screen extending substantially in the vertical direction, the second part of the screen extending substantially in a longitudinal direction perpendicular to the vertical direction, the connecting part extending in an oblique direction with respect to the vertical direction and the longitudinal direction.

\* \* \* \* \*